United States Patent [19]

Kelly

[11] Patent Number: 4,778,074
[45] Date of Patent: Oct. 18, 1988

[54] COMPOSITE MATERIAL AND METAL CANISTER

[75] Inventor: Charles J. Kelly, Rockledge, Pa.

[73] Assignee: Honeywell Inc., Minneapolis, Minn.

[21] Appl. No.: 71,450

[22] Filed: Jul. 8, 1987

[51] Int. Cl.$^4$ .................. B65D 43/00; H01M 2/02
[52] U.S. Cl. ..................... 220/4 R; 136/230; 220/320; 220/364; 429/163; 429/185
[58] Field of Search ............. 206/524.1, 524.3–524.6; 220/4 R, 3, 319, 320, 352, 359, 364; 136/230–235; 429/163, 175, 176, 177, 180, 181, 184, 185

[56] References Cited

U.S. PATENT DOCUMENTS

| | | | |
|---|---|---|---|
| 1,050,887 | 1/1913 | White | 429/185 |
| 3,390,017 | 6/1968 | Hennigan | 429/163 |
| 3,809,304 | 5/1974 | Flanders | 220/320 |
| 3,970,208 | 7/1976 | Raes | 220/3 |
| 4,190,196 | 2/1980 | Larsen | 220/319 |
| 4,307,158 | 12/1981 | Thibault | 429/185 |
| 4,396,381 | 8/1983 | Fanger | 220/352 |
| 4,483,458 | 11/1984 | Minning et al. | 220/320 |
| 4,709,833 | 12/1987 | Granberg et al. | 220/319 |

FOREIGN PATENT DOCUMENTS

| | | | |
|---|---|---|---|
| 3335459 | 4/1985 | Fed. Rep. of Germany | 429/163 |
| 0132668 | 8/1982 | Japan | 429/163 |
| 0125254 | 4/1919 | United Kingdom | 429/163 |

Primary Examiner—Jimmy G. Foster
Attorney, Agent, or Firm—Mitchell J. Halista; Albin Medved

[57] ABSTRACT

A composite material and metal canister has a cylindrical corrosion resistant metal shell and a composite material bulkhead within the shell which provides corrosion resistance and minimal weight coupled with the ability to withstand high internal pressures and bending stresses. The metal shell and the composite bulkhead are joined by a circumferential compression exerted on the shell by an external ring of shape memory material to produce a fluid-tight seal therebetween the shell and an adjacent bulkhead. A pair of composite material bulkheads and a pair of shape memory material rings can be used to seal both ends of the shell by locating an inner bulkhead and an external ring at respective ends of the shell.

12 Claims, 1 Drawing Sheet

COMPOSITE MATERIAL AND METAL CANISTER

BACKGROUND OF THE INVENTION

Field of the Invention

The present invention is directed to containers. More specifically, the present invention is directed to containers for withstanding high internal pressures and bending stresses at bulkhead joints.

SUMMARY OF THE INVENTION

An object of the present invention is to provide an improved canister for providing a lightweight structure capable of withstanding high internal pressures and bending stresses at bulkhead joints.

In accomplishing this and other objects, there has been provided, in accordance with the present invention a canister comprising a cylindrical shell, a bulkhead of a composite material arranged within the shell across one end of the shell and a compression ring of shape memory material for applying a compressive stress to the shell to join the shell to the bulkhead.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
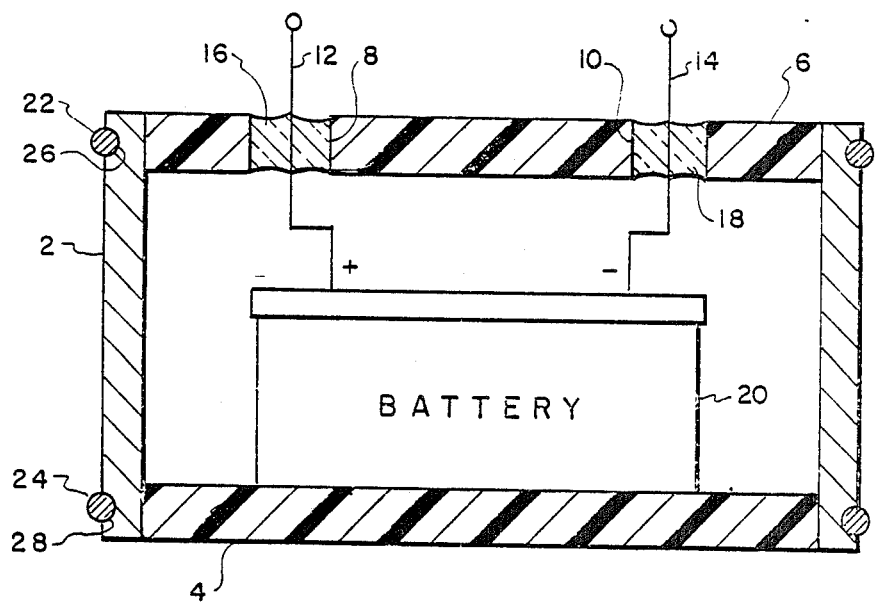
FIG. 1 is a cross-sectional illustration of a canister combining a first example of the present invention and FIG. 2 is a cross-sectional illustration of a canister embodying a second example of the present invention.

Referring to FIG. 1 in more detail, there is shown a canister embodying an example of the present invention and having a cylindrical outer shell 2 of a corrosion resistant thin material, e.g., stainless steel. A first end of the shell 2 is closed by a composite bulkhead 4 which may be of a graphite/epoxy thermoset material or a graphite/PPS thermoplastic material. Such materials are well-known in the art as discussed in the article entitled "Fabricating the Future With Composite Materials" on pages 29 to 35 in the November, 1986 issue of "Materials Engineering". The other end of the shell 2 is also closed by a similar bulkhead 6 having a pair of openings 8 and 10 therein. The openings 8 and 10 are arranged to encircle respective electrical leads 12 and 14 and are filled with corresponding glass-to-composite seals 16,18 to provide a fluid-tight hermetic seal and electrical isolation for the leads 12,14. The electrical leads 12 and 14 are connected to respective terminals of a battery 20 located within the shell 2 when the shell 2 is used as a battery canister.

A pair of shape memory material rings 22 and 24 are located in respective grooves 26 and 28 on an outside surface of the shell 2. The grooves 26 and 28 are aligned with the circumferential edges of the bulkheads 4 and 6, respectively. The rings 22,24 may be of a nickel-titanium alloy such as that discussed in the article, "Sealing with Shape-Memory Rings" on pages 74 and 76 of "Machine Design" of Aug. 7, 1986. The effect of the shape memory rings 22,24 is to exert compressive stresses on the shell 2 and on adjacent bulkheads 4 and 6 when the rings 22,24 return to an original shape or dimension at room temperatures to provide a fluid-tight hermetic seal between the shell 2 and the bulkheads 4 and 6.

The shell 2 and the bulkheads 4,6 are formed from materials which provide corrosion resistance while exhibiting high structural strength particularly in highly stressed areas such as the bulkheads 4,6. Further, the use of the composite material for the bulkheads 4,6 is effective to produce a lightweight structure which is a significant factor in weight limited structures such as battery canisters to be used in electronic packages for projectiles, torpedoes, etc. In such applications, excessive weight of the battery canister would reduce battery energy density. On the other hand, corrosion resistance and the ability to withstand high internal pressures and bulkhead joint bending stresses must be maintained. The lightweight composite material is effective to provide both characteristics while exhibiting a lightweight characteristic. The shape memory rings 22,24 are effective to provide high compressive forces to join the dissimilar materials to provide a fluid-tight hermetic seal between materials not amenable to material fusion, e.g., welding.

Figure 2:
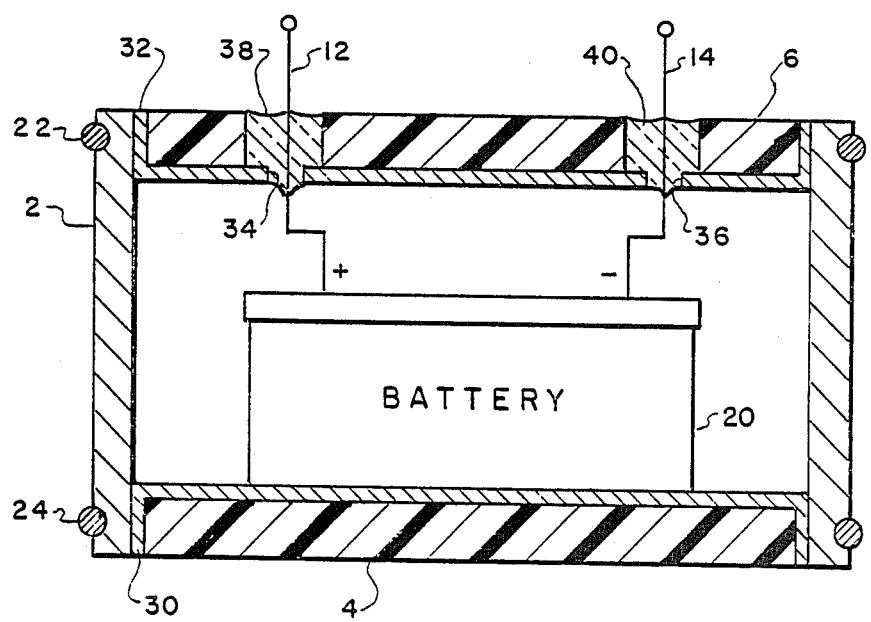

In FIG. 2, there is shown another example of the present invention wherein a lining material, e.g., stainless steel is used within the shell 2 to provide additional corrosion resistance. The lining material is in the form of a shallow cup 30 holding the first bulkhead 4 and a second shallow cup 32 holding the second bulkhead 6. The leads 12 and 14 are arranged to pass through the bulkhead 6 and through openings 34 and 36 in the second liner cup 32. Glass-to-metal seals 38 and 40 are located around the wires 12,14, respectively and are arranged to electrically isolate the leads 12,14 from the second cup 32. The remainder of the structure shown in FIG. 2 is similar to that found in FIG. 1 and described above including the shape memory rings 22,24.

Accordingly, it may be seen that there has been provided, in accordance with the present invention an improved canister for withstanding high internal pressures and bending stresses at bulkhead joints while exhibiting a lightweight structure.

The embodiments of the present invention in which an exclusive property or privilege is claimed are defined as follows:

1. A canister comprising
    a cylindrical shell made of stainless steel,
    a bulkhead of a corrosion resistant composite material located within said shell across one end of said shell, and
    a compression ring of shape memory material arranged to apply a compressive stress to said shell to join said shell to said bulkhead.

2. A canister as set forth in claim 1 wherein said bulkhead is made of a graphite/epoxy thermoset material.

3. A canister as set forth in claim 1 wherein said bulkhead is made of a graphite/PPS thermoplastic material.

4. A canister as set forth in claim 1 and further inculding a second bulkhead of a corrosion resistant composite material located across a second end of said shell and a second compression ring of shape memory material arranged to apply a compressive stress to said shell to join said shell to said second bulkhead.

5. A canister as set forth in claim 4 wherein said shell is made of stainless steel and said bulkheads are made of a graphite/glass thermoset material.

6. A canister as set forth in claim 4 wherein said shell is made of stainless steel and said bulkheads are made of a graphite/PPS thermoplastic material.

7. A canister as set forth in claim 4 and including a first cup within said shell holding said first bulkhead and in peripheral contact with said shell facing said first ring and a second cup within said shell holding said second bulkhead and in peripheral contact with said shell facing said second ring.

8. A canister as set forth in claim 7 wherein said first and second cups and said shell are made of stainless steel.

9. A canister as set forth in claim 1 and further including a cup within said shell holding said bulkhead and in peripheral contact with said shell facing said ring.

10. A canister as set forth in claim 9 and including a pair of electrical leads extending through said bulkhead and said cup and a pair of glass-to-metal seals arranged to seal respective ones of said leads to said bulkhead and said cup while providing electrical isolation of said leads.

11. A canister as set forth in claim 9 wherein said shell and said cup are made of stainless steel.

12. A canister as set forth in claim 1 and including a pair of electrical leads extending through said bulkhead and a pair of glass-to-composite seals arranged to seal respective ones of said leads to said bulkhead.

* * * * *